(12) United States Patent
Nakayama

(10) Patent No.: US 8,004,705 B2
(45) Date of Patent: Aug. 23, 2011

(54) PRINTING SYSTEM AND PRINTING METHOD USING TRANSFER OF COMPRESSED IMAGE DATA AND COMPRESSION PATTERN FROM HOST TO PRINTING APPARATUS

(75) Inventor: Toru Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1265 days.

(21) Appl. No.: 11/439,164

(22) Filed: May 24, 2006

(65) Prior Publication Data

US 2006/0274366 A1   Dec. 7, 2006

(30) Foreign Application Priority Data

Jun. 1, 2005   (JP) ................. 2005-161421

(51) Int. Cl.
*G06F 3/12* (2006.01)
*G06K 15/00* (2006.01)
(52) U.S. Cl. ..................... 358/1.15; 358/1.16
(58) Field of Classification Search ............. 358/1.15, 358/1.16
See application file for complete search history.

(56) References Cited

U.S. PATENT DOCUMENTS

| 6,062,673 | A | 5/2000 | Omo et al. | |
|---|---|---|---|---|
| 6,313,922 | B1 * | 11/2001 | Jackson | 358/1.16 |
| 6,525,830 | B1 * | 2/2003 | Yang | 358/1.1 |
| 7,580,151 | B2 | 8/2009 | Kurose et al. | |
| 2003/0123087 | A1 * | 7/2003 | Sakai et al. | 358/1.15 |

FOREIGN PATENT DOCUMENTS

| JP | 9-123527 A | 5/1997 |
|---|---|---|
| JP | 10-175333 A | 6/1998 |
| JP | 2005-128632 A | 5/2005 |

\* cited by examiner

*Primary Examiner* — Benny Tieu
*Assistant Examiner* — Sunil Chacko
(74) *Attorney, Agent, or Firm* — Fitzpatrick, Cella, Harper & Scinto

(57) ABSTRACT

This invention relates to a printing system, printing method, printing apparatus, and driver capable of printing at high-speed even when a transfer data amount increases. According to the system, in a host apparatus, a compression pattern of image data is generated. Image data corresponding to one print scan of a printhead is compressed by using the generated compression pattern. The generated compression pattern and the compressed image data corresponding to one print scan of the printhead are transferred to a printing apparatus. In a printing apparatus that executes multi-pass printing, the transferred compression pattern and the compressed image data are received. The received compression pattern is stored into a memory as a decompression pattern. The received compressed image data is decompressed by using the stored decompression pattern and stored in a print buffer. Multi-pass printing is executed by scanning the printhead by using the image data stored in the print buffer.

4 Claims, 14 Drawing Sheets

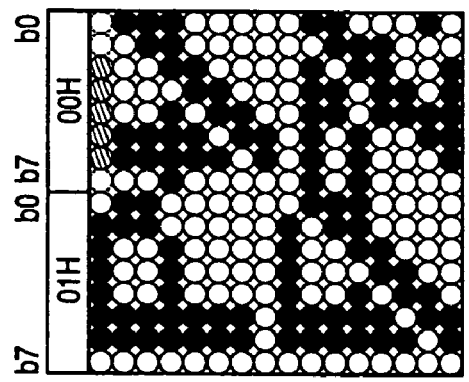
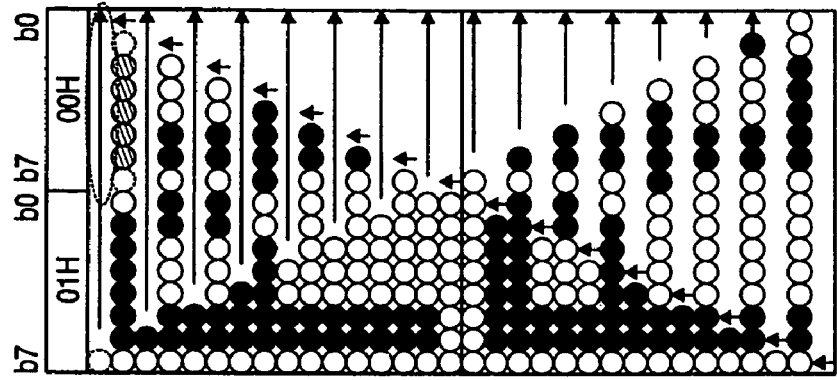
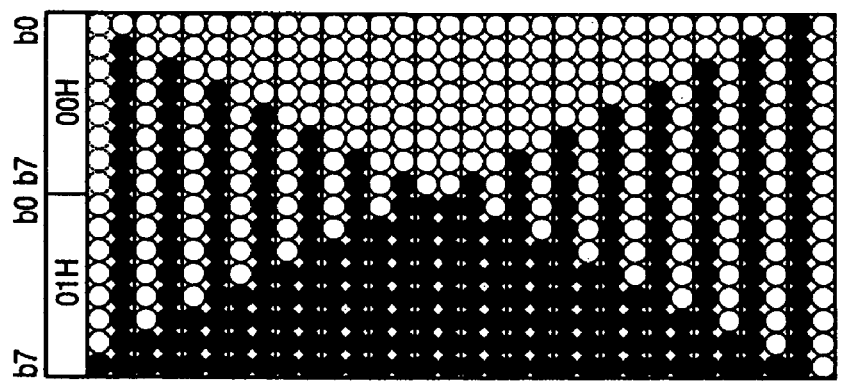
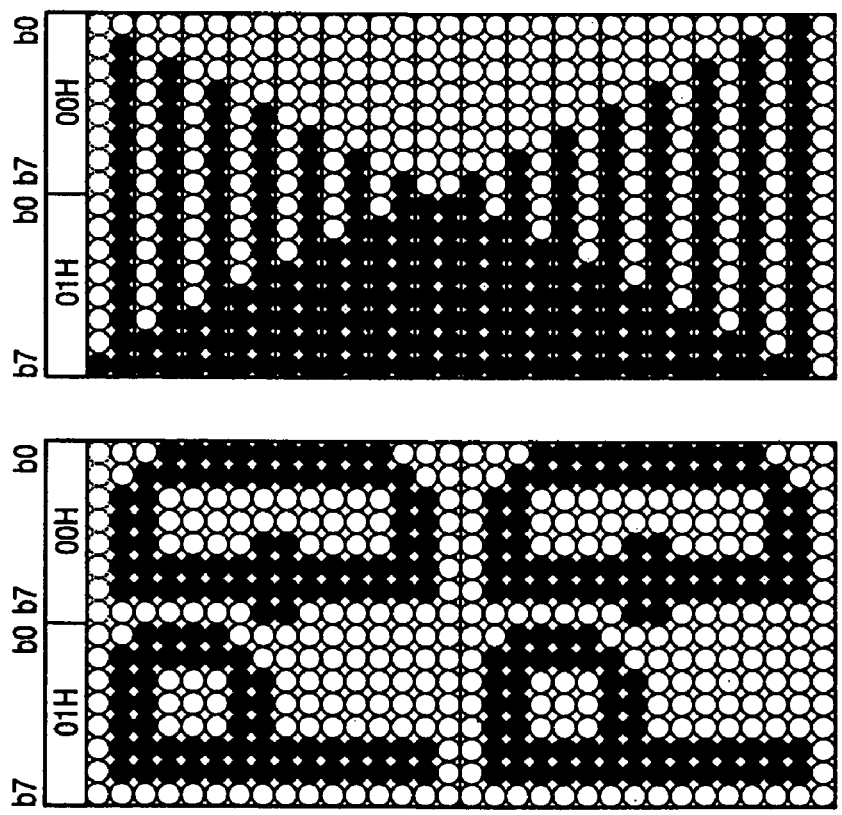

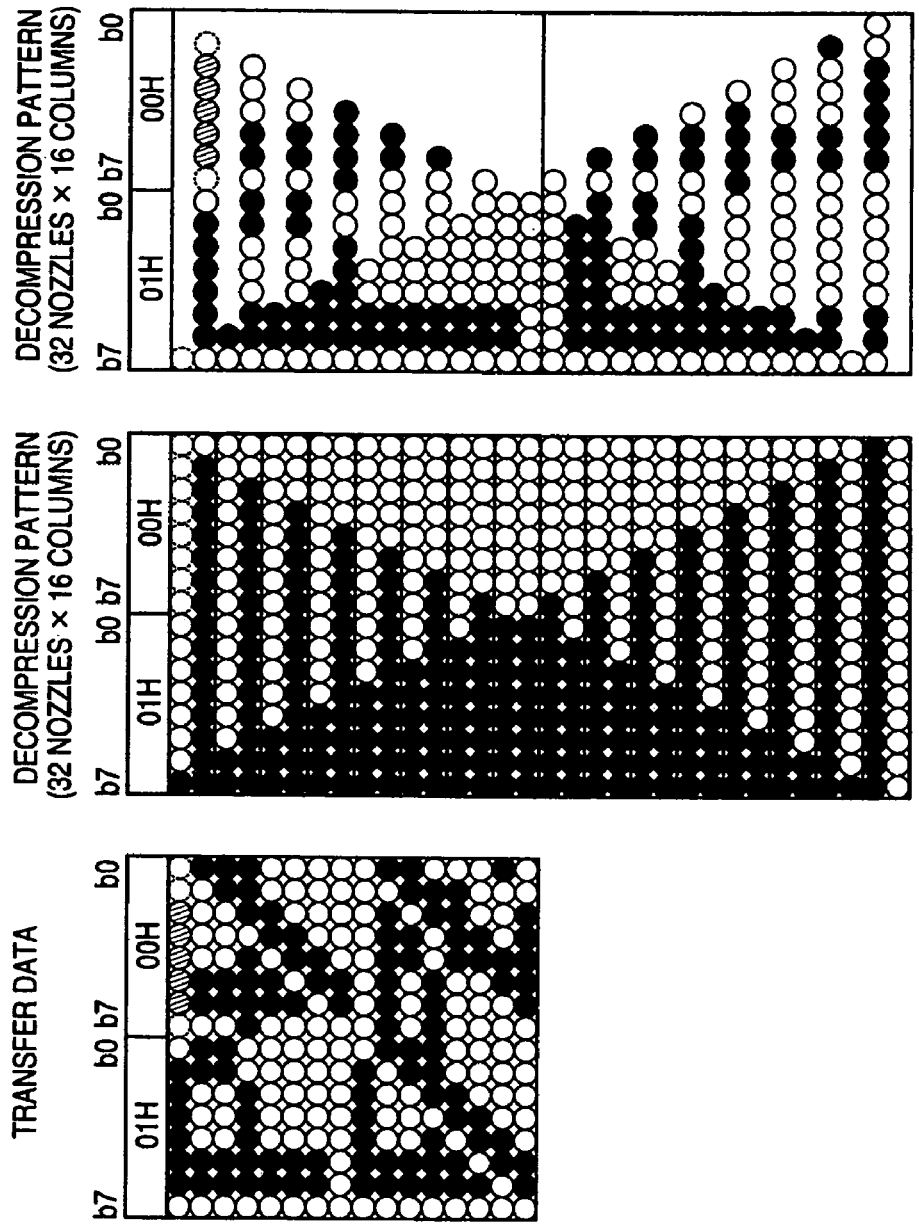

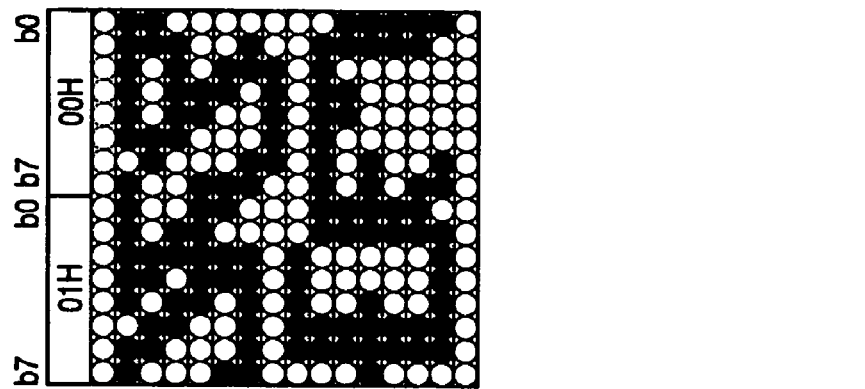
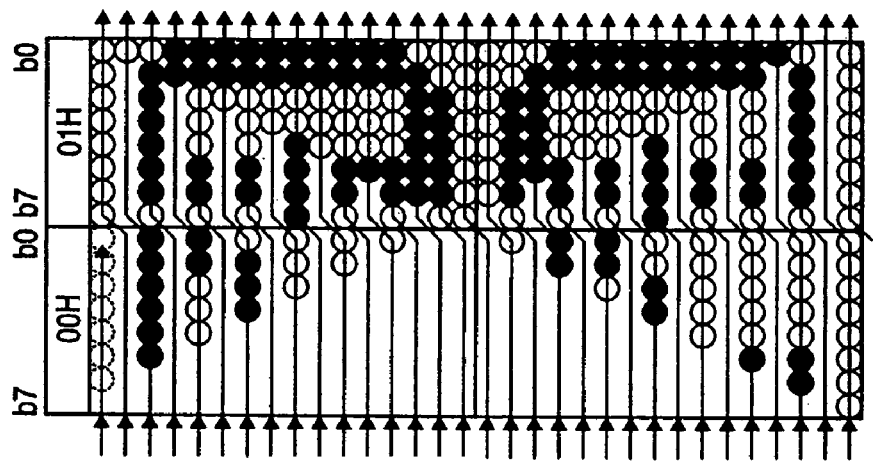
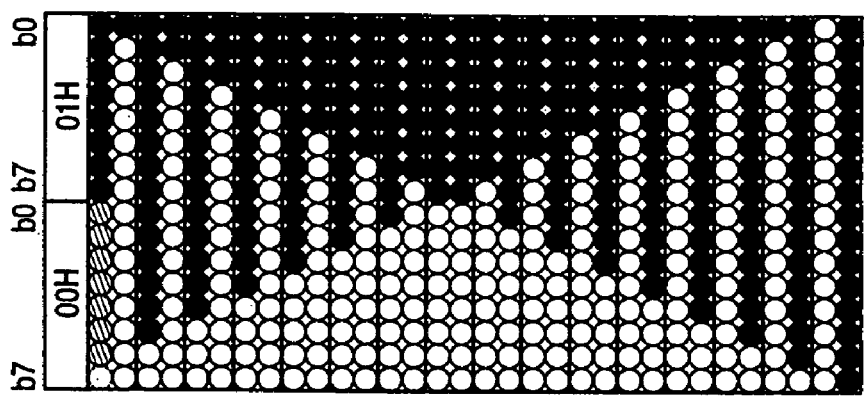
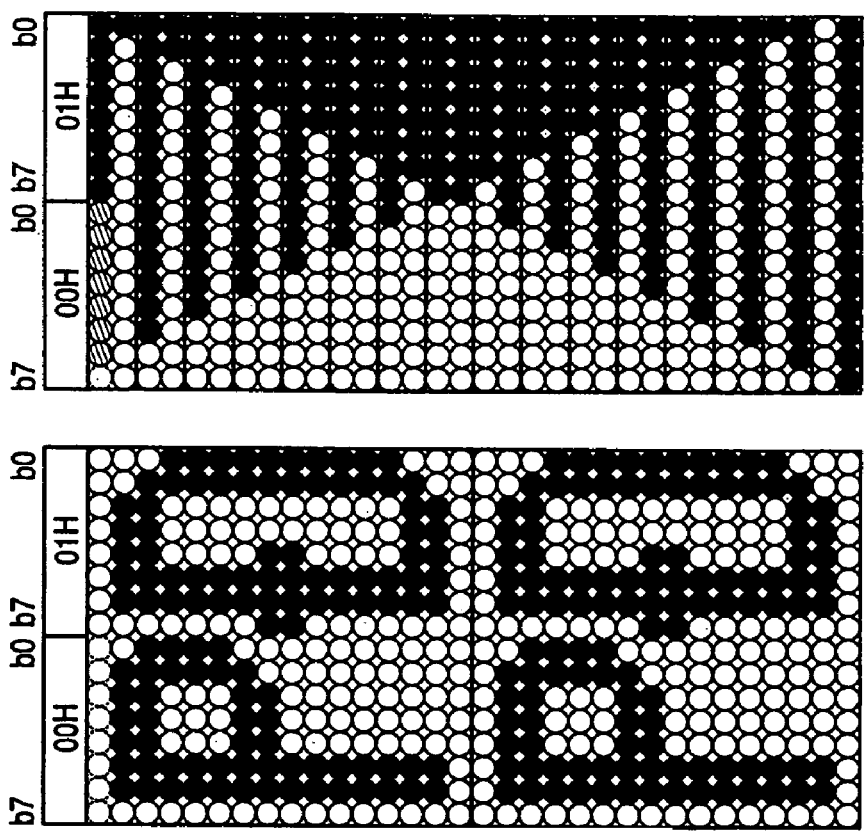

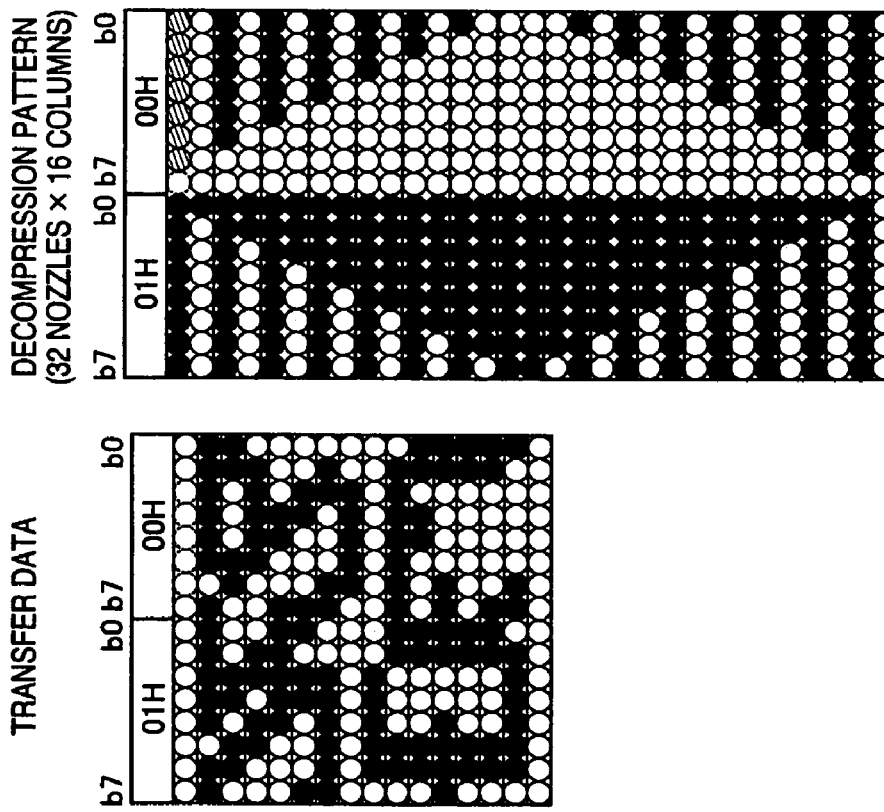
FIG. 7H DECOMPRESSED DATA (32 NOZZLES × 16 COLUMNS)
FIG. 7G DECOMPRESSED DATA (32 NOZZLES × 16 COLUMNS)
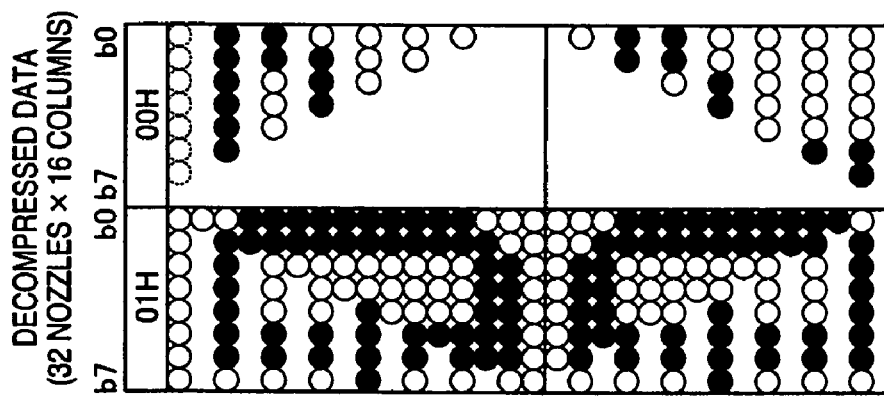
FIG. 7F DECOMPRESSION PATTERN (32 NOZZLES × 16 COLUMNS)
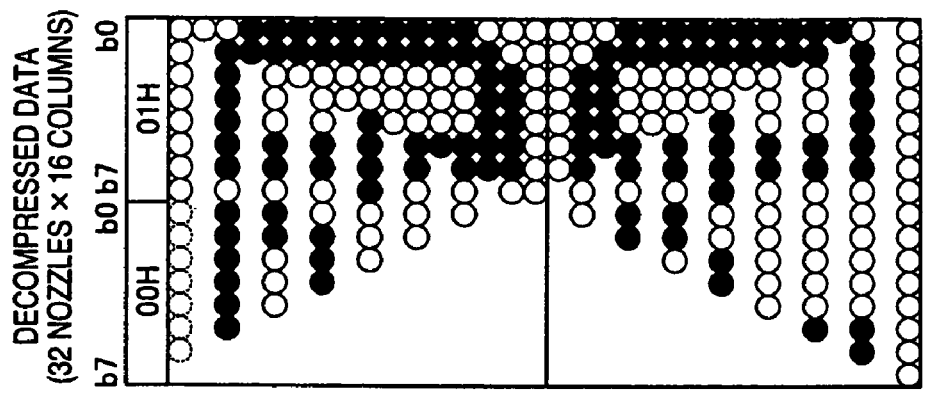
FIG. 7E TRANSFER DATA

FORWARD/BACKWARD PRINT DATA (32 NOZZLES × 16 COLUMNS)

FORWARD DECOMPRESSED DATA (32 NOZZLES × 16 COLUMNS)

BACKWARD DECOMPRESSED DATA (32 NOZZLES × 16 COLUMNS)

PRINTING SYSTEM AND PRINTING METHOD USING TRANSFER OF COMPRESSED IMAGE DATA AND COMPRESSION PATTERN FROM HOST TO PRINTING APPARATUS

FIELD OF THE INVENTION

This invention relates to a printing system, printing method, printing apparatus, and driver and, more particularly, to a printing system including a host computer and a printing apparatus that executes printing by using an inkjet printhead, a printing method used in the system, the printing apparatus, and a driver executed by the host computer.

BACKGROUND OF THE INVENTION

Conventionally, printing apparatuses using an inkjet printhead (to be referred to as a printhead hereinafter) are widely used in, e.g., printers and copying machines because of advantageous features such as quietness, low cost, low running cost, and small size.

A serial printing apparatus as one form of inkjet printing apparatuses executes printing by discharging ink to a printing medium while serially scanning a printhead (the scanning direction is called a main scanning direction). An operation of conveying the printing medium in a direction perpendicular to the scanning direction of the printhead is repeated in every scanning, thereby completing printing of one page of the printing medium.

Of these printing apparatuses, especially, a low-end printing apparatus reduces the cost by decreasing the print buffer capacity. More specifically, the print buffer capacity is smaller than the amount of print data to be used for printing in one printhead scanning. Particularly in color printing, an amount of color print data to be used for printing on a printing medium in one scan cycle is divided into a plurality of print blocks. Data of each print block is transferred from the host to the printing apparatus, thereby executing print control.

Examples of the apparatus are disclosed in Japanese Patent Publications Laid-Open Nos. 9-123527 and 10-175333.

However, to achieve high-quality printing required of recent printing apparatuses, the print data amount transferred from the host must be large. The above-described conventional arrangement takes too much time for print data transfer. The data transfer is too slow to execute high-speed printing.

Especially, in so-called multi-pass printing that is executed by scanning the printhead a plurality of number of times in the same region of a printing medium, the following problem arises with regard to each pass printing. Data necessary for printing of an entire region to be printed by multi-pass printing is transferred from the host, although not all the necessary data is used for actual printing. When the data amount increases, the transfer load becomes heavy. Hence, it is impossible to cope with high-speed multi-pass printing.

SUMMARY OF THE INVENTION

Accordingly, the present invention is conceived as a response to the above-described disadvantages of the conventional art.

For example, a printing system, printing method, printing apparatus, and driver according to the present invention are capable of printing at high-speed even when a transfer data amount increases.

According to one aspect of the present invention, preferably, there is provided a printing system including a host apparatus which generates and transfers image data and a printing apparatus which executes multi-pass printing on a printing medium by receiving the transferred image data and scanning a printhead on the basis of the image data, wherein the host apparatus comprises: compression pattern generation means for generating a compression pattern of the image data; compression means for compressing the image data corresponding to one print scan of the printhead by using the compression pattern generated by the compression pattern generation means; and transfer means for transferring, to the printing apparatus, the compression pattern generated by the compression pattern generation means and the compressed image data, compressed by the compression means, corresponding to one print scan of the printhead, and the printing apparatus comprises: reception means for receiving the transferred compression pattern and the compressed image data; storage means for storing the compression pattern received by the reception means as a decompression pattern; decompression means for decompressing, by using the decompression pattern stored in the storage means, the compressed image data received by the reception means; a print buffer which stores the image data decompressed by the decompression means; and printing means for executing multi-pass printing by scanning the printhead by using the image data stored in the print buffer.

The compression means of the host apparatus preferably comprises first compression means for executing compression using the compression pattern, and second compression means for packbits-compressing the image data compressed by the first compression means. On the other hand, the decompression means of the printing apparatus preferably comprises first decompression means for packbits-decompressing the received compressed image data, and second decompression means for decompressing, by using the decompression pattern, the image data packbits-decompressed by the first decompression means.

The compression pattern may be changed for each image data to be used for one print scan of the printhead.

According to another aspect of the present invention, preferably, there is provided a printing method in a printing system including a host apparatus which generates and transfers image data and a printing apparatus which executes multi-pass printing on a printing medium by receiving the transferred image data and scanning a printhead on the basis of the image data, comprising the steps of: generating a compression pattern of the image data; compressing the image data corresponding to one print scan of the printhead by using the generated compression pattern; and transferring, to the printing apparatus, the generated compression pattern and the compressed image data corresponding to one print scan of the printhead; receiving the transferred compression pattern and the compressed image data; storing, into a memory, the received compression pattern as a decompression pattern; decompressing, by using the decompression pattern stored in the memory, the received compressed image data, and storing the image data in a print buffer; and executing multi-pass printing by scanning the printhead by using the image data stored in the print buffer.

According to still another aspect of the present invention, preferably, there is provided a printing apparatus which executes multi-pass printing on a printing medium by receiving compressed image data transferred from a host apparatus and scanning a printhead on the basis of the compressed image data, comprising: reception means for receiving the compressed image data corresponding to one print scan of the printhead and a compression pattern which has been used to generate the compressed image data; storage means for storing the compression pattern received by the reception means as a decompression pattern; decompression means for decompressing, by using the decompression pattern stored in the storage means, the compressed image data received by the reception means; a print buffer which stores the image data decompressed by the decompression means; and printing means for executing multi-pass printing by scanning the printhead by using the image data stored in the print buffer.

The compression pattern may be received from the host apparatus for each image data to be used for one print scan of the printhead.

The capacity of the print buffer is smaller than an amount of image data necessary for one print scan of the printhead.

The printhead preferably comprises an inkjet printhead that executes printing by discharging ink.

According to still another aspect of the present invention, preferably, there is provided a driver executed in a host apparatus which generates image data and transfers the image data to a printing apparatus which executes multi-pass printing on a printing medium by scanning a printhead, comprising: compression pattern generation means for generating a compression pattern of the image data; compression means for compressing the image data corresponding to one print scan of the printhead by using the compression pattern generated by the compression pattern generation means; and transfer means for transferring, to the printing apparatus, the compression pattern generated by the compression pattern generation means and the compressed image data, compressed by the compression means, corresponding to one print scan of the printhead.

The invention is particularly advantageous since the transfer capability between the host and the printing apparatus can cope with high-speed printing. The reason for this is as follows. Image data to be used for printing on a printing medium by one scan printing of the printhead is compressed and transferred to the printing apparatus. In multi-pass printing, the transfer data amount from the host in each pass printing decreases, and the transfer time shortens.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 6A to 6G are views showing the relationship between a compression/decompression pattern used for backward printing and compression/decompression of print data;

FIGS. 7A to 7H are views showing the relationship between a compression/decompression pattern used for forward printing and compression/decompression of print data;

DETAILED DESCRIPTION OF THE PREFERRED EMBODIMENT

A preferred embodiment of the present invention will now be described in detail in accordance with the accompanying drawings.

Constituent elements described in the following embodiment are merely examples, and the scope of the invention is not limited to them.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

<Basic Arrangement of Printing Apparatus (FIGS. 1 and 2)>

Figure 1:
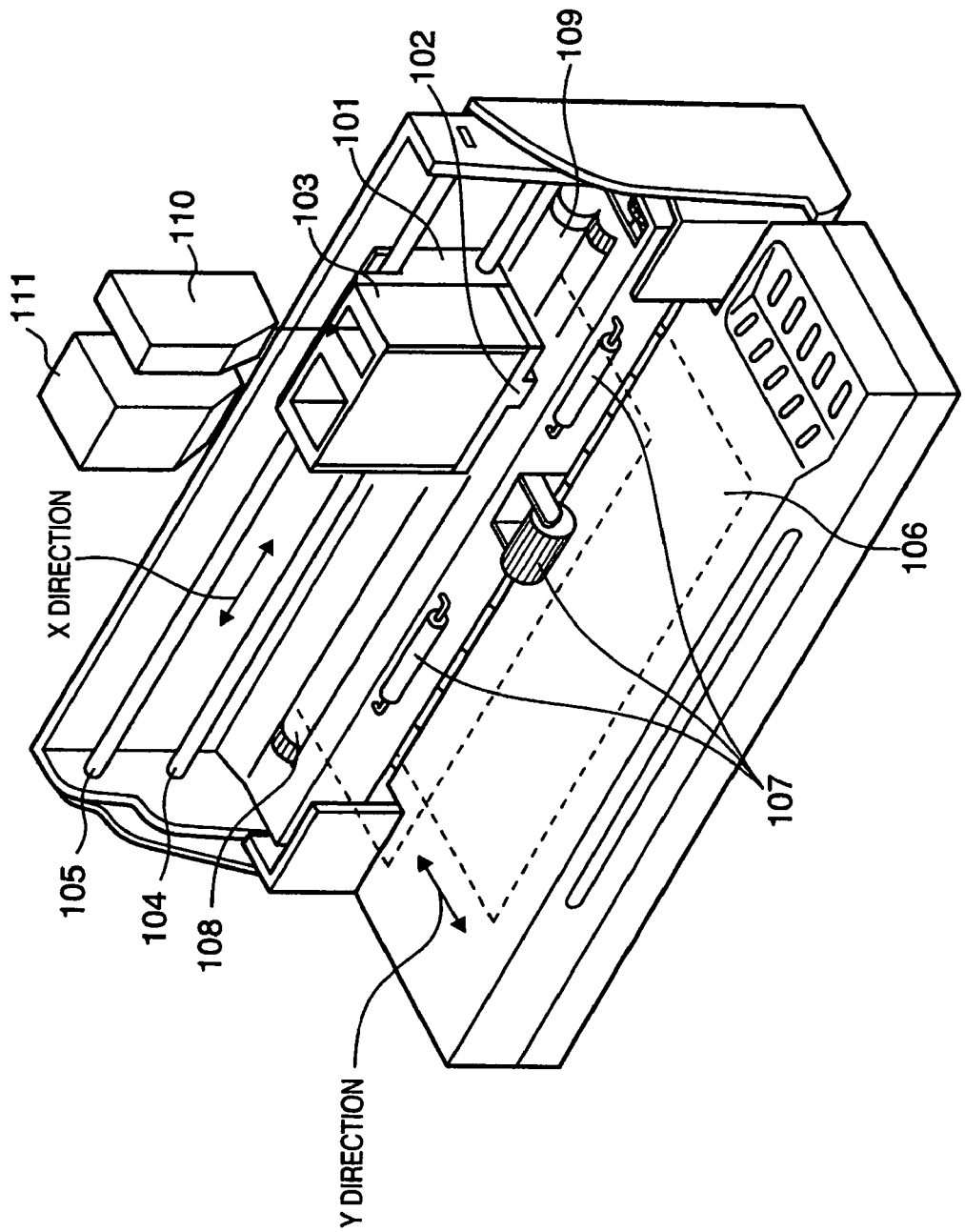
FIG. 1 is a perspective view showing the arrangement of a printing apparatus having an inkjet printhead according to a typical embodiment of the present invention.

FIG. 1 is an outer perspective view of a printing apparatus which executes printing by using an inkjet printhead according to a typical embodiment of the present invention. This printing apparatus can execute both color printing and monochrome printing.

As shown in FIG. 1, a printhead 102 and a cartridge guide 103 are mounted on a carriage 101. The printhead 102 has 320 nozzles that discharge black (K) ink and 3×192 nozzles that discharge three color inks, i.e., cyan (C), magenta (M), and yellow (Y) inks, respectively. An ink cartridge 110 containing black ink and an ink cartridge 111 containing the three remaining color inks are attached along the cartridge guide 103.

In the printing operation, the cyan (C), magenta (M), yellow (Y), and black (K) inks are supplied from the ink cartridges to the printhead 102. Driving signals to discharge the inks from the nozzles of the printhead 102 are supplied through a flexible cable (not shown) containing a number of lead wires.

The carriage 101 is mounted on two guide rails 104 and 105. When an endless belt 109 connected to the carriage 101 is driven by a carriage motor (to be described later), the carriage 101 reciprocally moves in the X-direction (to be referred to as a main scanning direction hereinafter). A conveyance roller 108 is driven by a conveyance motor (to be described later) to convey a printing paper sheet 106 in the Y direction (to be referred to as a sub-scanning direction hereinafter).

Figure 2:
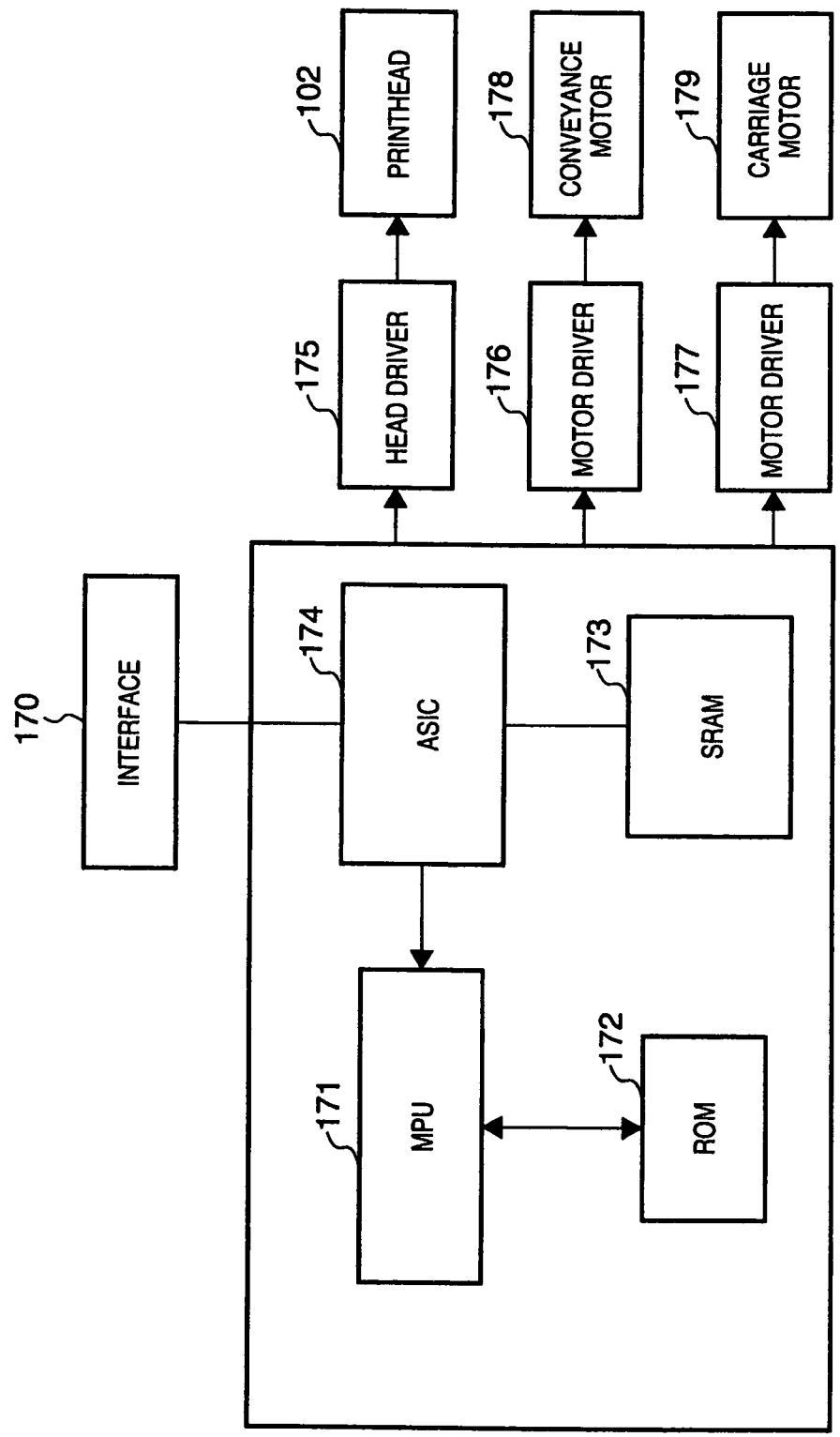
FIG. 2 is a block diagram showing the control configuration of the printing apparatus shown in FIG. 1.

FIG. 2 is a block diagram showing the control circuit of the printing apparatus shown in FIG. 1.

Referring to FIG. 2, reference numeral 170 denotes an interface that inputs a print signal and control signal from, e.g., an external device such as a host computer; 171, an MPU; 172, a ROM that stores a control program (including character fonts as needed) to be executed by the MPU 171; and 173, a RAM (e.g., an SRAM or SDRAM) that temporarily saves various kinds of data (e.g., the print signal and print data to be supplied to the printhead). A logic circuit (ASIC) 174 performs print control of the printhead 102 and also data transfer control between the interface 170, MPU 171, and SRAM 173. A carriage motor 179 moves the carriage 101, to which the printhead 102 is mounted, in the main scanning direction. A conveyance motor 178 conveys a printing medium such as a printing paper sheet in the sub-scanning direction. A head driver 175 drives the printhead 102. Motor drivers 176 and 177 drive the conveyance motor 178 and carriage motor 179, respectively.

The outline of the operation of the control circuit will be described. When a print signal is input to the interface 170, the print signal is converted to print data for printing between the logic circuit (ASIC) 174 and the MPU 171. The motor drivers 176 and 177 are driven. In addition, the printhead 102 is driven in accordance with the print data sent to the head driver 175 so that a printing operation is executed.

The arrangement of functional roles of a host computer and a printing apparatus with the above-described arrangement will be explained in comparison with the arrangement of functional roles of a conventional printing system.

Figure 3:
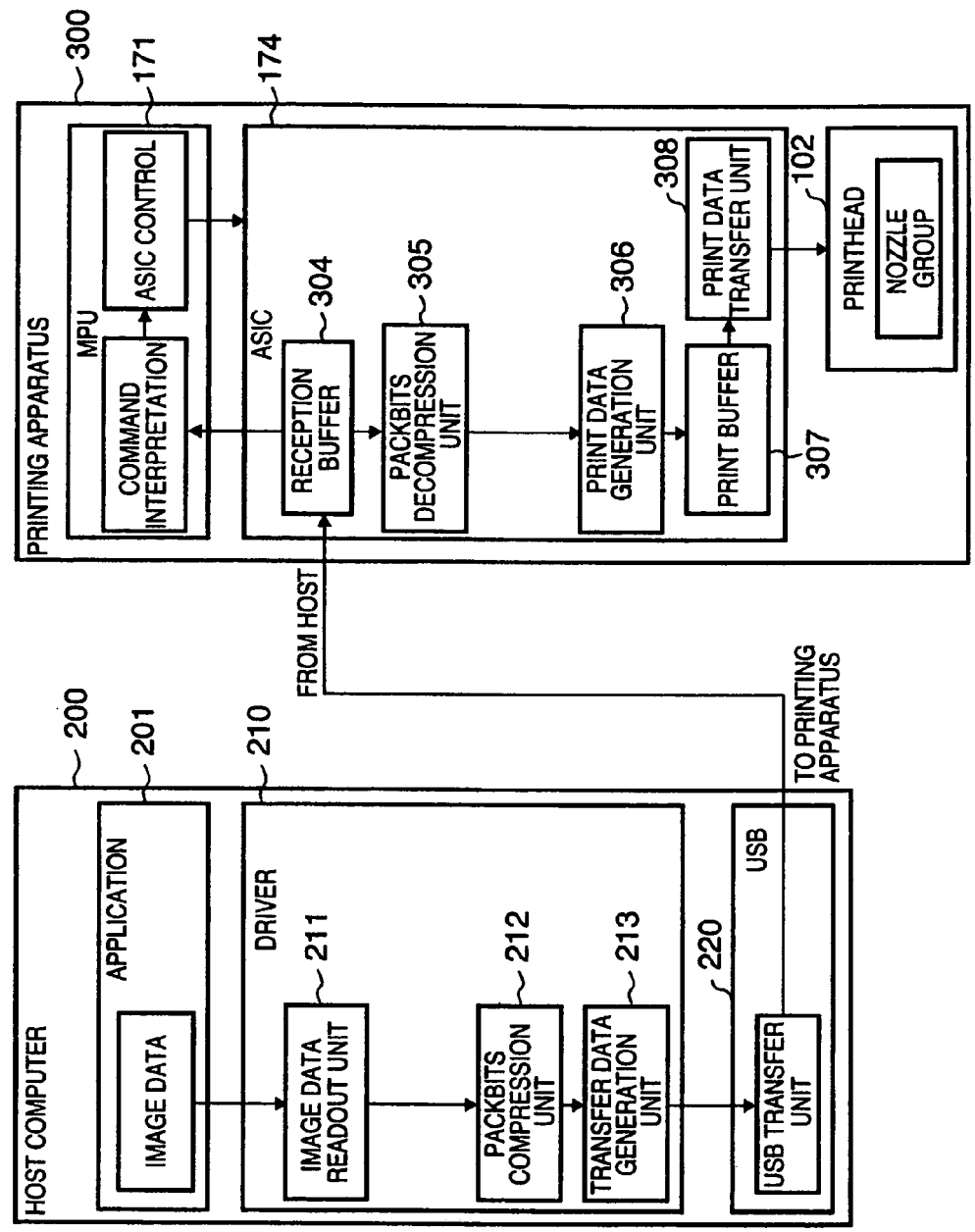
FIG. 3 is a block diagram for explaining the respective functional roles of a host computer and a printing apparatus included in a conventional printing system.

FIG. 3 is a block diagram for explaining the respective functional roles of a host computer and a printing apparatus included in a conventional printing system. The same reference numerals as in FIGS. 1 and 2 already described above denote the same constituent elements in FIG. 3. As shown in FIG. 3, a host computer (to be referred to as a host hereinafter) 200 and a printing apparatus 300 are connected by, e.g., a USB interface. However, any other interface (e.g., centronics) may be used.

The host 200 comprises an application 201 which generates image data, a driver 210 which generates transfer data to be transferred to the printing apparatus on the basis of the image data generated by the application, and a USB unit 220 which transfers the transfer data to the printing apparatus.

In the driver 210, an image data readout unit 211 reads but data in a predetermined amount. A packbits compression unit 212 executes packbits compression of the readout data. A transfer data generation unit 213 generates transfer data from the packbits-compressed data. The USB unit 220 receives the transfer data generated by the transfer data generation unit 213 and outputs the data to the printing apparatus through the USB interface.

On the other hand, the printing apparatus 300 causes the MPU 171 to interpret a command transmitted from the host 200 and control the ASIC 174.

The data sent from the host 200 and received through the interface 170 is stored in a reception buffer 304. A packbits decompression unit 305 of the ASIC 174 decompresses the packbits-compressed data stored in the reception buffer 304.

A print data generation unit 306 generates print data from the decompressed data and stores the print data in a print buffer 307. A print data transfer unit 308 reads out the print data from the print buffer 307 and transfers the data to the printhead 102.

Figure 4:
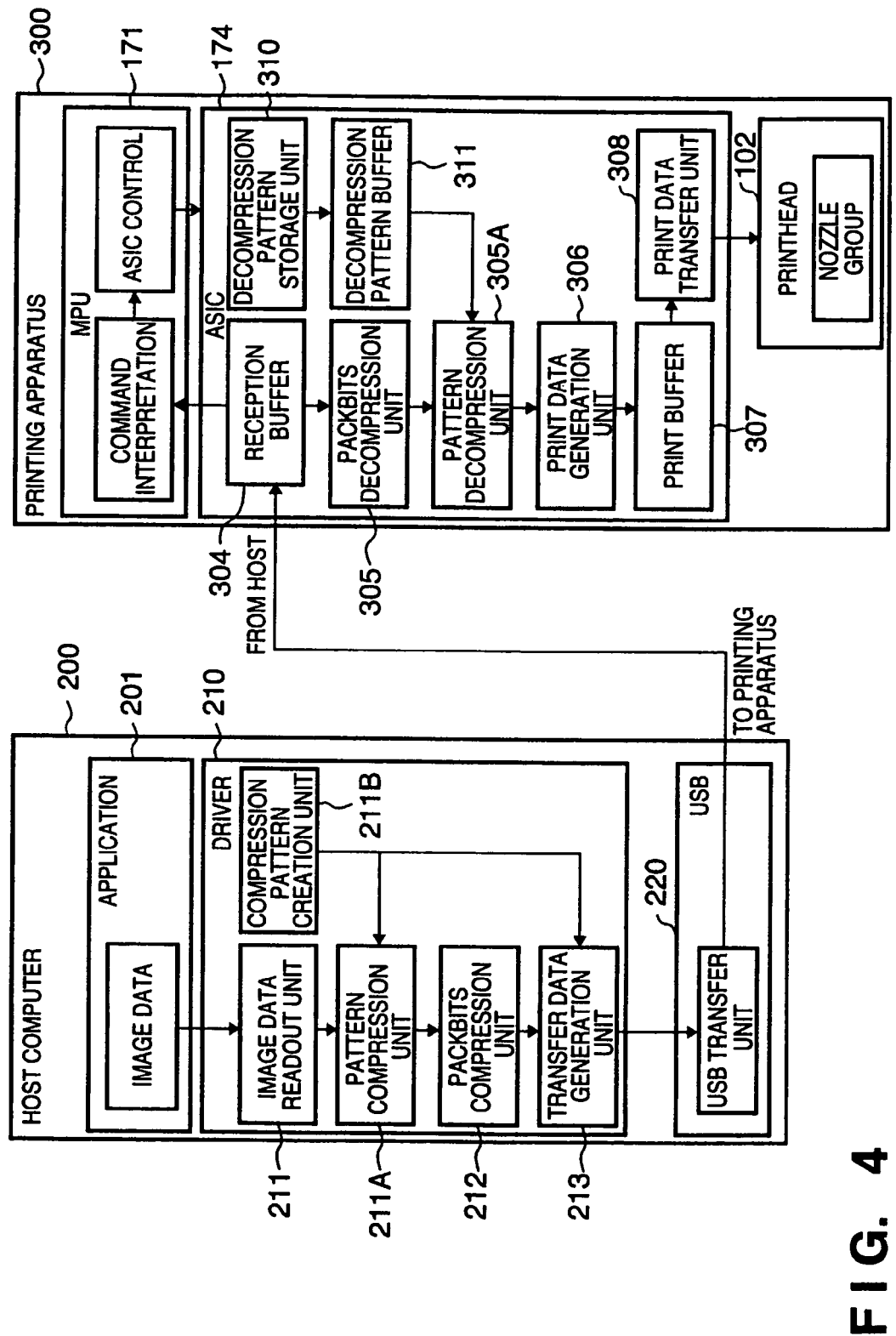
FIG. 4 is a block diagram for explaining the respective functional roles of a host computer and a printing apparatus included in a printing system according to a typical embodiment of the present invention.

FIG. 4 is a block diagram for explaining the respective functional roles of a host computer and a printing apparatus included in a printing system according to the embodiment. The same reference numerals as in FIGS. 1 to 3 already described above denote the same constituent elements in FIG. 4, and a description thereof will be omitted.

According to this embodiment, in the host 200, a pattern compression unit 211A is provided between the image data readout unit 211 and the packbits compression unit 212. The pattern compression unit 211A compresses, on the basis of a compression pattern (compression information) generated by a compression pattern creation unit 211B, data read out by the image data readout unit 211. The compressed data is further compressed by the packbits compression unit 212. The compression pattern generated by the compression pattern creation unit 211B is also sent to the transfer data generation unit 213.

As described above, in this embodiment, compression processing is executed in two steps of pattern compression and packbits compression in the host 200. With this processing, the amount of data to be transferred to the printing apparatus is reduced.

On the other hand, the printing apparatus 300 comprises a pattern decompression unit 305A between the packbits decompression unit 305 and the print data generation unit 306. The pattern decompression unit 305A further decompresses, on the basis of the compression pattern, the compressed data decompressed by the packbits decompression unit 305. The compression pattern is prepared in advance for use in the pattern decompression unit 305A by causing a decompression pattern storage unit 310 to read out, from the reception buffer, the compression pattern transmitted from the host 200 and store the pattern in a decompression pattern buffer 311.

As described above, in this embodiment, decompression processing is executed in two steps of packbits decompression and pattern decompression.

Figure 5:
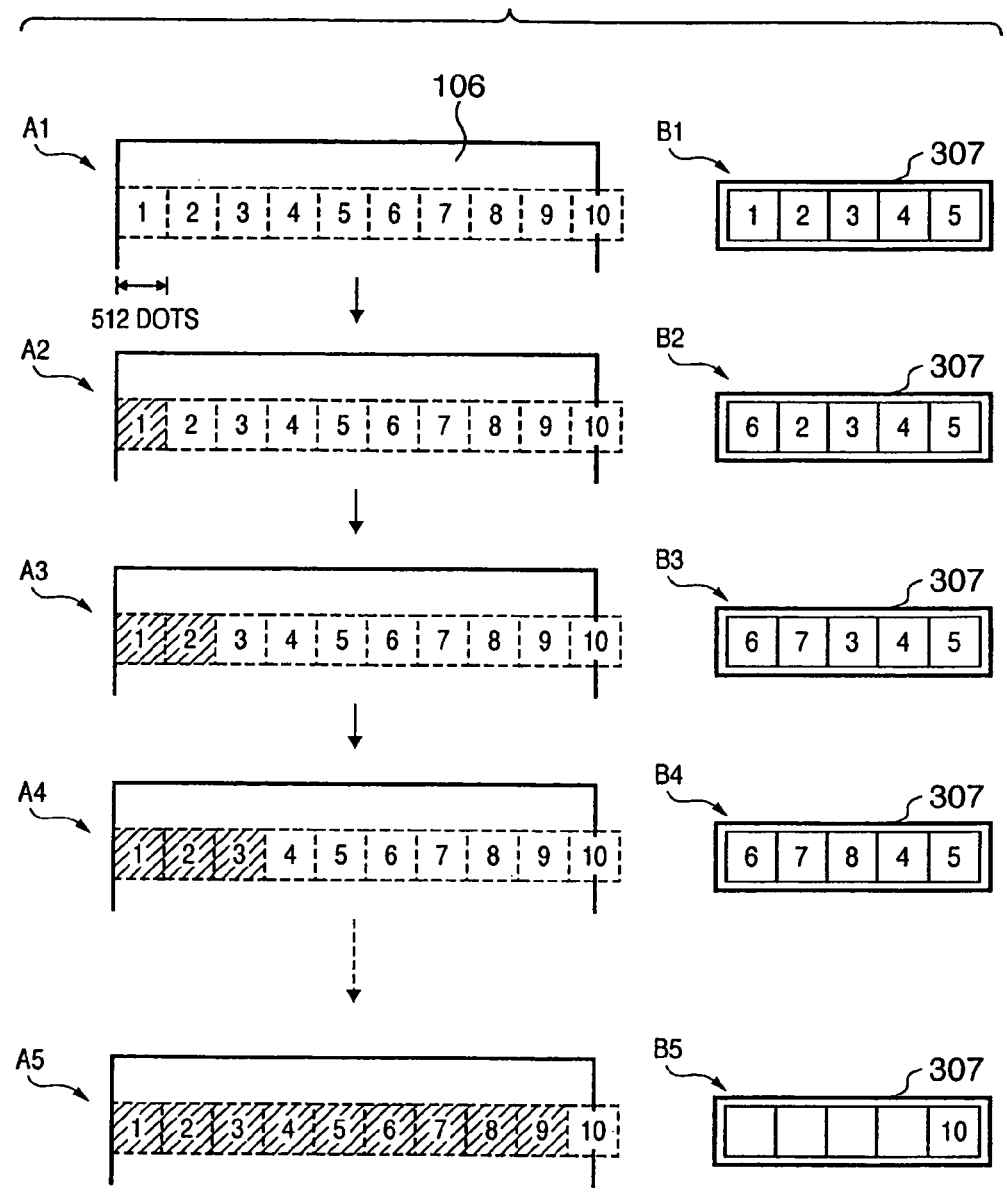
FIG. 5 is a view for explaining the relationship between print data stored in a print buffer and printing on a printing medium.

FIG. 5 is a view for explaining the relationship between print data stored in the print buffer and printing on a printing medium.

The capacity of the print buffer 307 of this embodiment is smaller than the amount of print data necessary for the printhead 102 to execute printing in one scan cycle. The data necessary for printing in one scan cycle is virtually divided into 10 blocks, as indicated by (A1) to (A5) in FIG. 5. As indicated by (B1) in FIG. 5, when print data corresponding to five blocks is stored in the print buffer 307, scanning of the printhead 102 is started to execute printing. In this embodiment, the size of each block in the main-scanning direction is 512 dots.

When the printhead has scanned the 512 dots of the first block 1 and ended printing, as indicated by (A2) in FIG. 5, the print data of block 6 is stored in the area of the print buffer 307 where block 1 was stored, as indicated by (B2) in FIG. 5. When the printhead 102 has scanned the 512 dots of second block 2 and ended printing, as indicated by (A3) in FIG. 5, the print data of block 7 is stored in the area of the print buffer 307 where block 2 was stored, as indicated by (B3) in FIG. 5.

Printing is executed while sequentially reusing the memory areas of printed blocks, as indicated by (A4), (B4), (A5), and (B5) in FIG. 5. When printing using print data stored in final block 10 is ended, printing in one scan cycle is ended.

As described above, in this embodiment, printing is executed by efficiently using the print buffer having a capacity smaller than the amount of print data necessary for printing in one scan cycle.

Print data compression and decompression executed by the host and printing apparatus will be described next using actual print data.

FIGS. 6A to 6G are views showing the relationship between a compression/decompression pattern and compression/decompression of print data. FIGS. 6A to 6G show printing (backward printing) executed when the printhead 102 scans from the left to right in FIG. 1. In the example shown in FIGS. 6A to 6G, the size of the image block is 32 nozzles (vertical direction; sub-scanning direction)×16 columns (horizontal direction; main scanning direction). The size of the compression/decompression pattern is 32 nozzles (vertical direction)×16 columns (horizontal direction). The size is expressed by using dots as 16 dots (horizontal direction)×32 dots (vertical direction).

In this embodiment, image data and compression/decompression pattern contain one bit per dot. Referring to FIGS. 6A to 6G, an open circle (○) indicates a dot with a bit value of "0", a filled circle (●) indicates a dot with a bit value of "1", and a portion having neither the open circle nor the filled circle indicates a portion without data (null data).

FIG. 6A shows original image data generated by the application 201. FIG. 6B shows a compression pattern generated by the compression pattern creation unit 211B. In this case, to compress image data to ½, an image block of 16 dots×32 dots is compressed to 16 dots×16 dots. Hence, the base unit of compression/decompression is 16 dots.

Compression is performed in the following way. Each bit of the original image data is compared with a corresponding bit of the compression pattern. The value of the original image data is left in a portion where the dot of the compression pattern is a filled circle. A portion where the dot is an open circle is replaced with null data (in other words, converted into null data). Compressed data shown in FIG. 6C is obtained in this way.

Since null data remain in the compressed data shown in FIG. 6C, the data is packed in the vertical and horizontal directions while removing the null data in accordance with arrows in FIG. 6C. With this manipulation, compressed data shown in FIG. 6D is obtained. In this way, compressed data of 16 dots×16 dots is obtained.

FIG. 6E shows transfer data transferred from the host 200 to the printing apparatus 300. FIG. 6F shows a decompression pattern (identical to the compression pattern) transferred from the host 200 to the printing apparatus 300. FIG. 6G shows decompressed data generated from the transfer data and decompression pattern in the printing apparatus 300.

FIGS. 7A to 7H are views showing the relationship between a compression/decompression pattern used for forward printing and compression/decompression of print data. FIGS. 7A to 7H show printing (forward printing) executed when the printhead 102 scans from the right to left in FIG. 1. In the example shown in FIGS. 7A to 7H, the size of the image block is 32 nozzles (vertical direction; sub-scanning direction)×16 columns (horizontal direction; main scanning direction). The size of the compression/decompression pattern is 32 nozzles (vertical direction)×16 columns (horizontal direction). The size is expressed by using dots as 16 dots (horizontal direction)×32 dots (vertical direction).

In this embodiment, image data and compression/decompression pattern contain one bit per dot. Referring to FIGS. 7A to 7H, an open circle (○) indicates a dot with a bit value of "0", a filled circle (●) indicates a dot with a bit value of "1", and a portion having neither the open circle nor the filled circle indicates a portion without data (null data).

FIG. 7A shows original image data generated by the application 201. FIG. 7B shows a compression pattern generated by the compression pattern creation unit 211B. Also, in this case, to compress image data to ½, an image block of 16 dots×32 dots is compressed to 16 dots×16 dots. Hence, the base unit of compression/decompression is 16 dots.

Compression is performed in the following way. Each bit of the original image data is compared with a corresponding bit of the compression pattern. The value of the original image data is left in a portion where the dot of the compression pattern is a filled circle. A portion where the dot is an open circle is replaced with null data. Compressed data shown in FIG. 7C is obtained in this way.

Since null data remain in the compressed data shown in FIG. 7C, the data is packed in the vertical and horizontal directions while removing the null data in accordance with arrows in FIG. 7C. With this manipulation, compressed data shown in FIG. 7D is obtained. In this way, compressed data of 16 dots×16 dots is obtained.

FIG. 7E shows transfer data transferred from the host 200 to the printing apparatus 300. FIG. 7F shows a decompression pattern (identical to the compression pattern) transferred from the host 200 to the printing apparatus 300. In FIG. 7F, a bit order from a higher byte (01H) to lower byte (00H) is replaced in harmony with data handling in the decompressed data generation circuit. FIG. 7G shows decompressed data generated from the transfer data and decompression pattern in the printing apparatus 300.

FIG. 7H shows that a bit order from the higher byte (01H) to lower byte (00H) in the decompressed data, which have been replaced in harmony with data handling in the decompressed data generation circuit, are replaced again to restore the data to the printed image on a paper sheet.

Figure 8C:
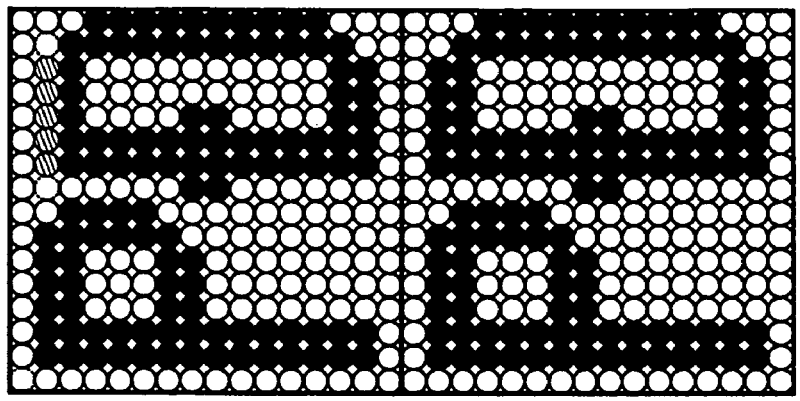
FIGS. 8A to 8C are views showing printing by executing scan printing twice while reciprocally moving the printhead.
Figure 8B:
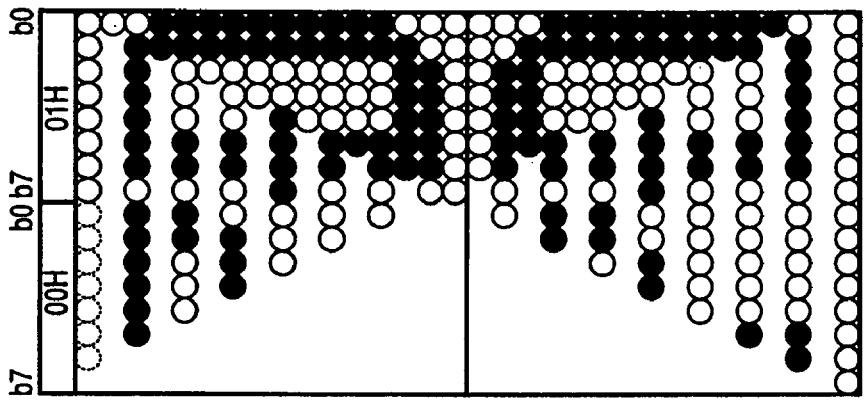
Figure 8A:
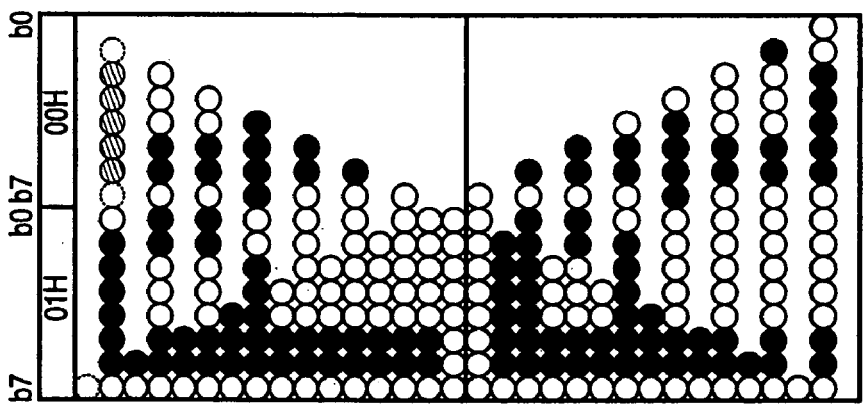

FIGS. 8A to 8C are views showing printing by executing scan printing twice while reciprocally moving the printhead.

As is apparent from comparison between FIGS. 6A to 6G and FIGS. 7A to 7H, the printing operation is performed by using the same image data. In forward printing, the printing is executed using a half of the image data (FIG. 6G). Backward printing is executed using the remaining half of the image data (FIG. 7H).

Hence, FIGS. 8A to 8C show a case where printing in the forward direction of the printhead (FIG. 8B) and printing in the backward direction (FIG. 8A) are executed without conveying the printing medium in the sub-scanning direction, and printed images shown in FIGS. 6A to 6G and FIGS. 7A to 7H are combined to form a complete image (FIG. 8C).

More specifically, assume that the print data amount transferred from the host to the printing apparatus during two scan printing operations by one reciprocal movement of the printhead is defined as 192 nozzles (vertical direction; sub-scanning direction)×8 inches (horizontal direction; main scanning direction) at 4800 dpi, and two-pass printing is executed. In this case, according to the conventional method, data of 192× 4800×8=9,216,000 [bytes] is transferred. In this embodiment, the data amount can be reduced to about ½.

In three- or four-pass printing, only image-data necessary for each pass printing is transferred. Hence, the transfer data amount in each pass printing is reduced to about ⅓ or ¼. Note that, since the compression pattern must be transferred from the host to the printing apparatus in advance in either case, the transfer amount increases by the data amount of the compression pattern. As described above, the compression pattern size is about 32×16 dots. Even when different compression patterns are used for the respective color components, the data transfer amount is only about 4 times as 32×16 dots. This increase amount is relatively very small, compared to the whole transfer reduction amount.

The above-described image data generation, image data compression and transfer, compressed image data decompression are executed by the host and printing apparatus in cooperation. The processes will be described next with reference to flowcharts. The processing of the host and that of the printing apparatus will be described in this order.

Figure 9:
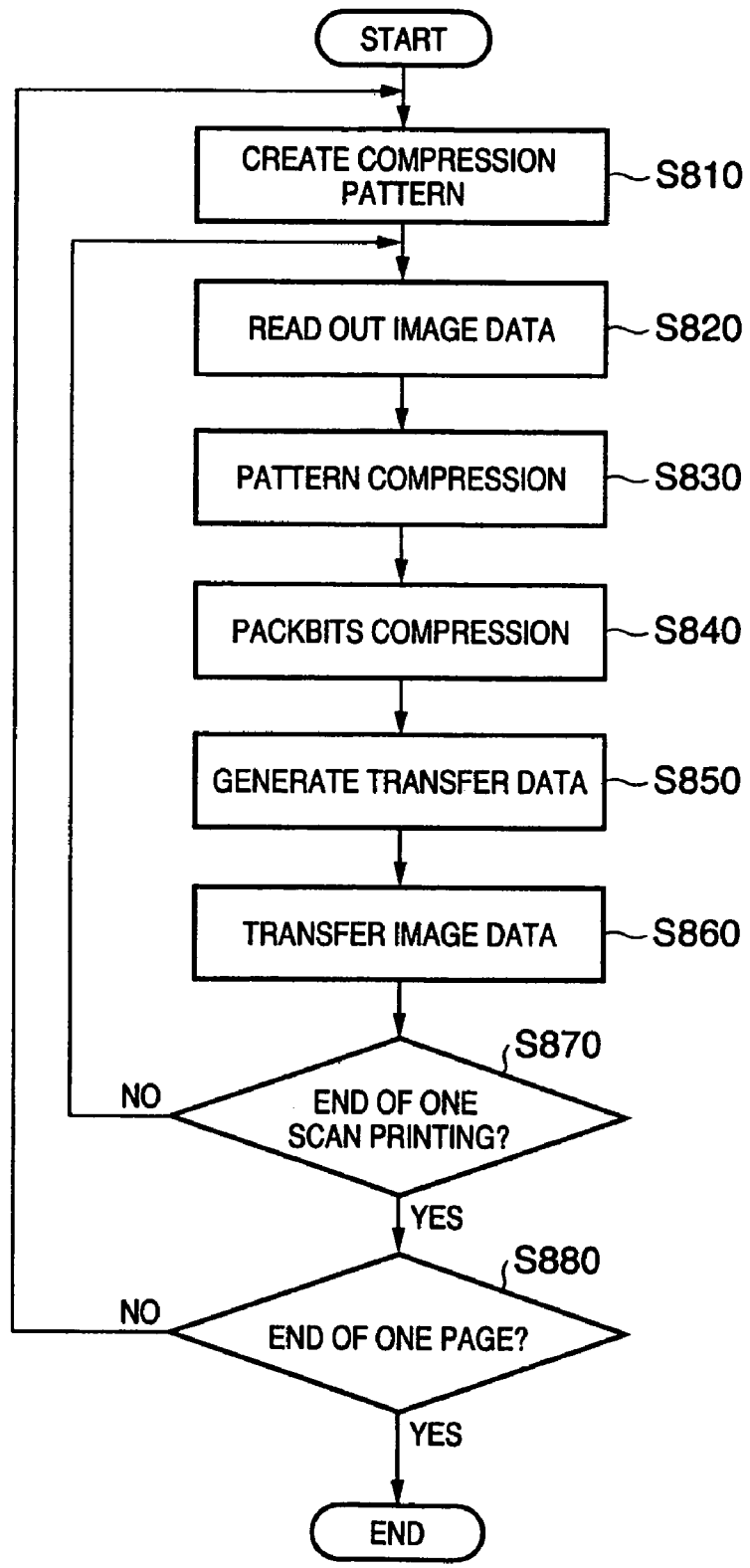
FIG. 9 is a flowchart showing processing by a driver 210 of a host 200.

FIG. 9 is a flowchart showing processing by the driver 210 of the host 200. This flowchart describes processing of one page of a printing medium. The driver is software executed by a CPU included in the host. The codes of the software are installed in the memory or disk drive of the host.

In step S810, the compression pattern creation unit 211B creates a compression pattern for image data to be used for printing of one scan cycle of the printhead. In step S820, image data generated by the application 201 is input, and the image data readout unit 211 execute readout processing of the image data.

The compression pattern is shown in, e.g., FIG. 6B or 7B. Image data readout indicates readout in a size shown in, e.g., FIG. 6A or 7A.

In step S830, the pattern compression unit 211A compresses the readout image data by referring to the compression pattern. In step S840, packbits compression of the compressed image data is further executed. In step S850, transfer data is generated. In step S860, the transfer data is transferred to the printing apparatus. In this transfer processing, the compression pattern is transferred to the printing apparatus at the start of each scan printing.

In step S870, it is checked whether or not transfer of image data corresponding to one scan cycle of the printhead is ended. If "YES" in step S870, the processing advances to step S880. If "NO" in step S870, the processing returns to step S820 to repeat the above-described processing.

In step S880, it is checked whether or not transfer of image data necessary for printing of one page of the printing medium is ended. If "YES" in step S880, the processing is ended. If "NO" in step S880, the processing returns to step S810 to repeat the above-described processing. For example, if scanning is executed five times per page of the printing medium, the above-described processing is repeated five times.

In the above-described processing, the created pattern changes in every scan printing. However, a single pattern may be used during printing of one page of the printing medium. In the former case, a new compression pattern is transferred to the printing apparatus at the start of each scan printing. In the latter case, the compression pattern is transferred to the printing apparatus at the start of printing of one page of the printing medium.

FIGS. 10A to 10D are flowcharts showing processing on the side of the printing apparatus 300.

Figure 10A:
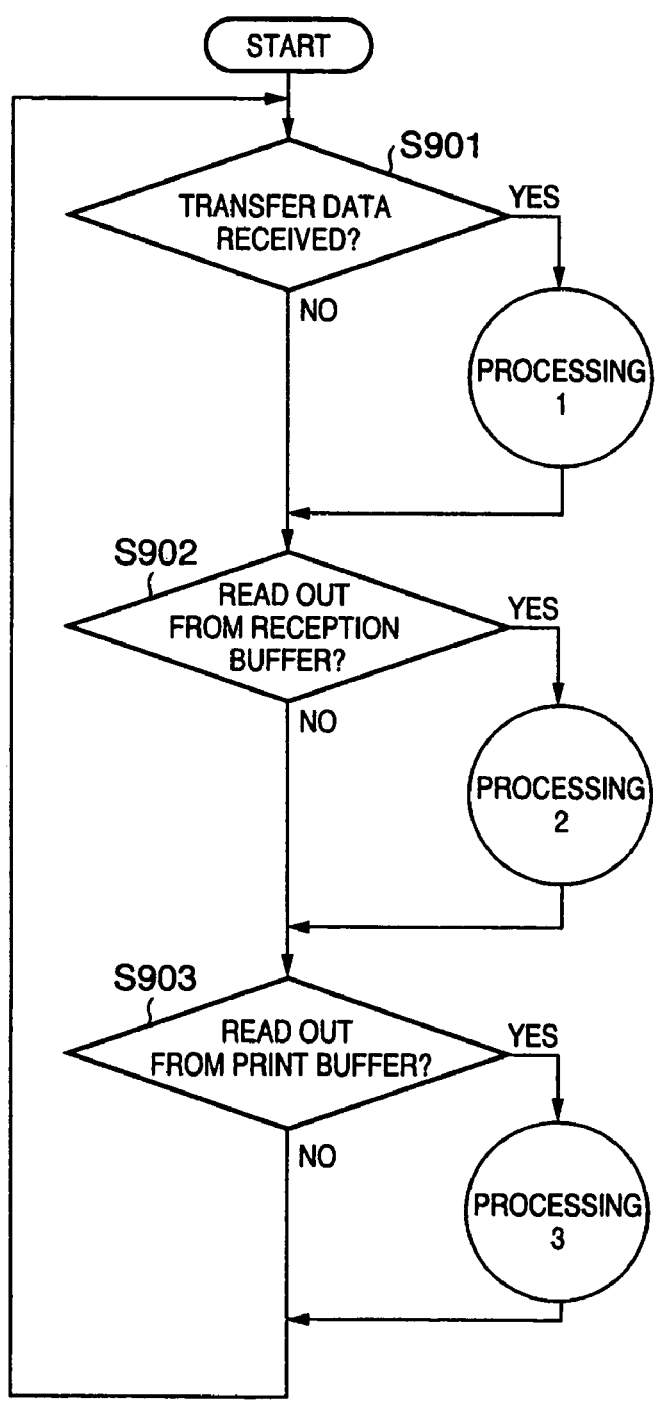
FIGS. 10A to 10D are flowcharts showing processing on the side of a printing apparatus 300.

FIG. 10A is a flowchart showing the outline of determination processing executed by the MPU 171.

In step S901, it is determined whether to receive transfer data from the host. In step S902, it is determined whether to read out data stored in the reception buffer. In step S903, it is determined whether to read out print data from the print buffer. In these determination steps, execution of processing 1 to processing 3 is controlled. When processing 1 is ended, the flow advances to step S902. When processing 2 is ended, the flow advances to step S903. When processing 3 is ended, the flow returns to step S901.

Processing 1 to processing 3 will be described below with reference to the flowcharts shown in FIGS. 10B to 10D.

Figure 10B:
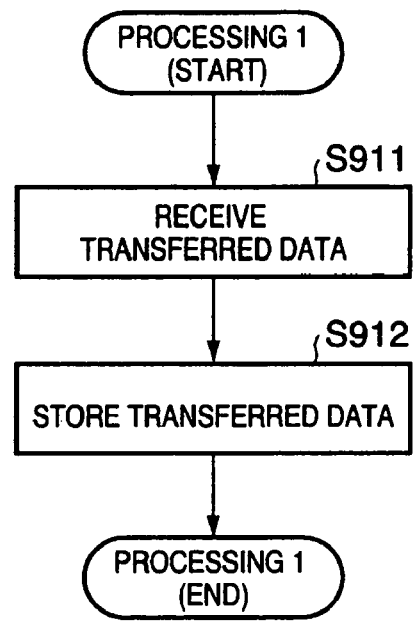

Referring to FIG. 10B, transfer data is received in step S911. In step S912, the transfer data is stored in the reception buffer 304.

Figure 10C:
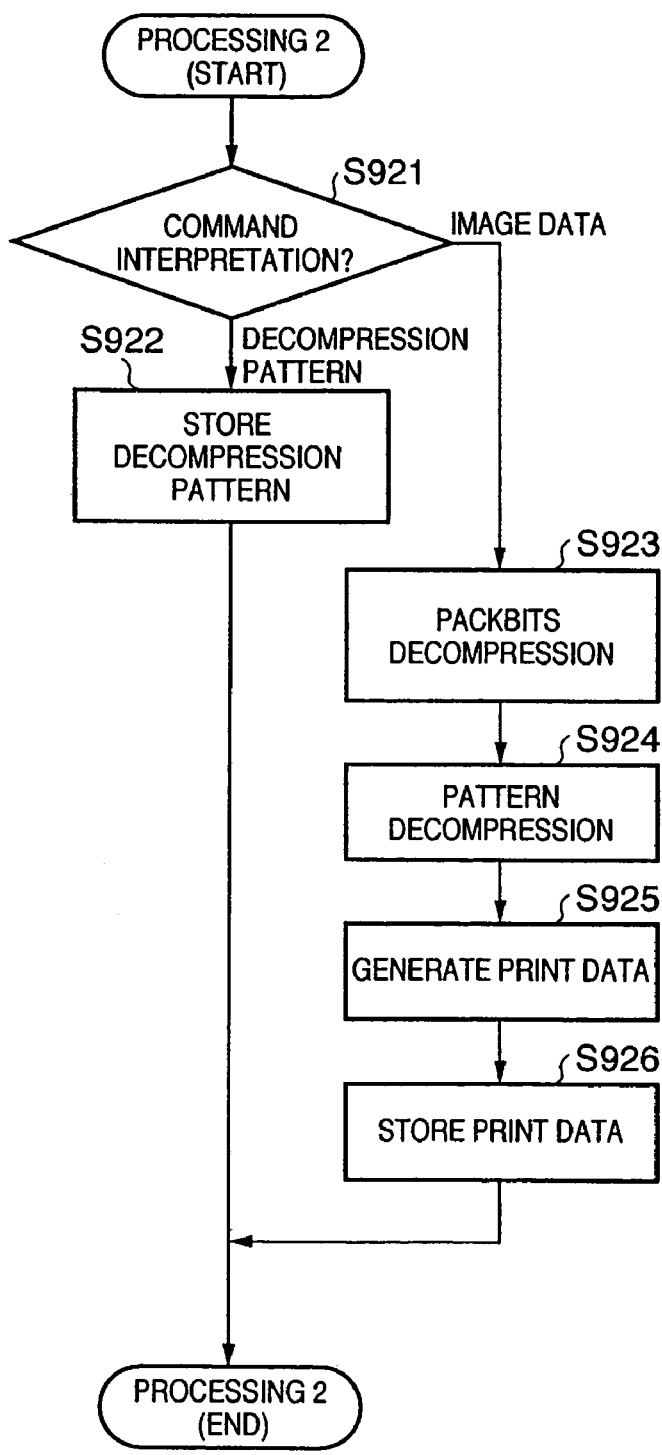

Referring to FIG. 10C, in step S921, the MPU 171 interprets a command transmitted from the host and stored in the reception buffer 304. If it is determined as a result of interpretation that the command is a compression pattern (decompression pattern), the processing advances to step S922 to store the compression pattern (decompression pattern) in the decompression pattern storage unit 310. On the other hand, if it is determined as a result of interpretation that the command is image data, the processing advances to step S923 to cause the packbits decompression unit 305 to execute packbits decompression. In step S924, the pattern decompression unit 305A executes pattern decompression processing by using the compression pattern (decompression pattern) sent from the host. In step S925, the print data generation unit 306 generates print data on the basis of the decompressed image data. In step S926, the print data is stored in the print buffer 307.

Print data storage in the print buffer 307 is executed in the following way.

Figure 11A:
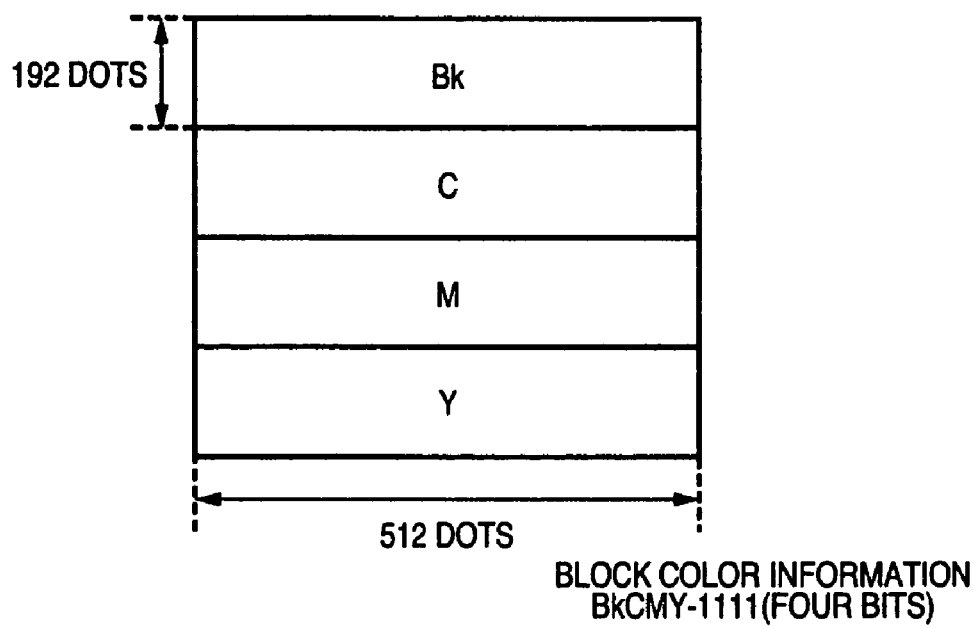
FIGS. 11A and 11B are views showing the use of a print buffer memory.
Figure 11B:
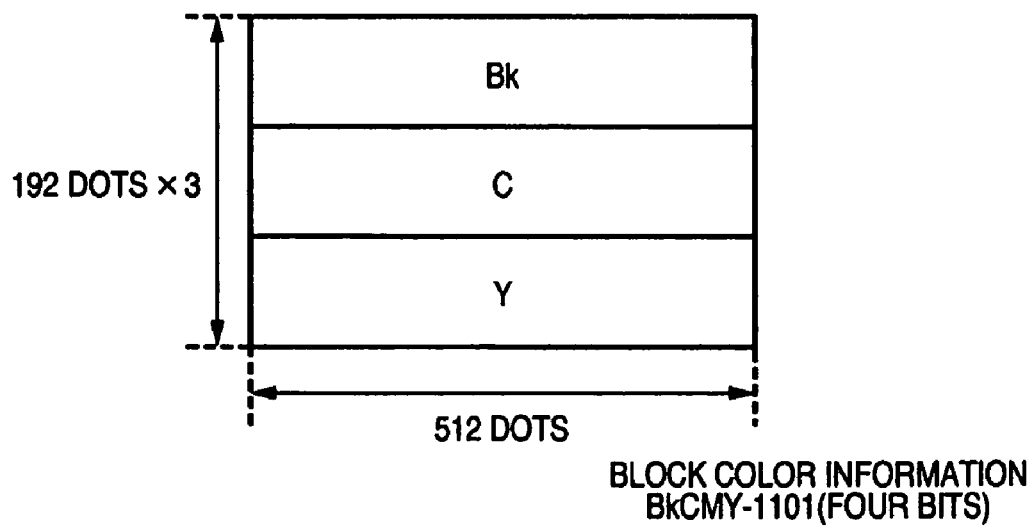

FIGS. 11A and 11B are views showing the use of the print buffer.

Fundamentally, one block of the print buffer has a size corresponding to the number of nozzles of the printhead, i.e., 192 dots (sub-scanning direction)×512 dots (main scanning direction). In correspondence with the density components (YMCBk) of color image data, four areas are normally reserved in the memory.

FIG. 11A shows a case where print data of the respective color components, i.e., black (Bk), cyan (C), magenta (M), and yellow (Y) of a block are stored. Normally, four print buffers with the same size are reserved in correspondence with the color components of color image data. However, if print data of a specific color component, e.g., magenta (M) component is not present in the block, the print buffer area for the magenta (M) component is released, as shown in FIG. 11B. As described above, in this embodiment, the use area of the print buffer is dynamically reserved or released in accordance with the presence/absence of print data of each block. Hence, the use area of the print buffer can be saved.

For this reason, in this embodiment, the availability of the print buffer is managed by using 4-bit block color information (BkCMY) representing the presence/absence of print data of each color component of a block. For example, since the print data of all color components are present in FIG. 11A, the bit values of the block color information are BkCMY="1111". To the contrary, in the example shown in FIG. 11B, since the print data of the magenta (M) component is not present, BkCMY="1101".

Figure 10D:
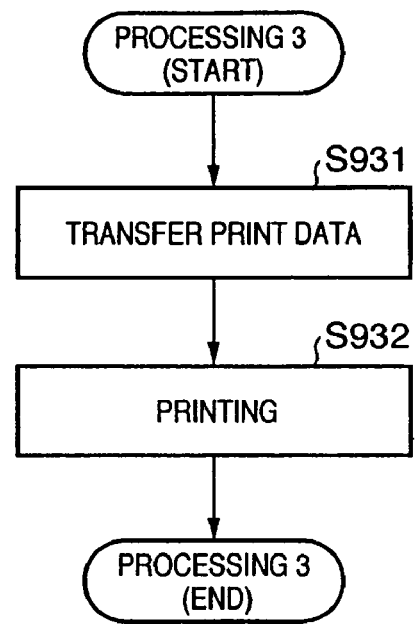

Referring to FIG. 10D, in step S931, the print data is read out from the print buffer 307 and transferred to the printhead 102. In step S932, the printhead 102 is driven to execute printing on the printing medium.

The above-described processing operations are executed in parallel by using the MPU 171 and ASIC 174.

According to the above-described embodiment, image data is compressed and transferred from the host to the printing apparatus in every scan printing. In the printing apparatus, the compressed image data is decompressed and used for printing. Hence, the data transfer amount in each scan printing decreases. For this reason, the period of time for data transfer in each scan printing also shortens so that the apparatus can cope with high-speed printing. In addition, since this embodiment employs an arrangement where a compression pattern is input in correspondence with scan-printing, it need not to hold more than one compression pattern. This contributes to minimizing a storage area for the compression pattern.

In this embodiment, the number of nozzles of the printhead is 320 for black ink and 192 for each of the remaining color inks. However, the present invention is not limited to this. The number of nozzles is relevant to the number of bits of print data, which are used to discharge ink from the nozzles, in the sub-scanning direction. Hence, the number of the bits may be an easily accessible number from the MPU, i.e., eight, 16, or 32.

The present invention is not limited to the number of print buffers and the print buffer size described in the above embodiment, either. The number of print buffers and the print buffer size can be changed depending on the apparatus arrangement.

It is assumed in the above-described embodiment that a droplet discharged from the printhead is ink, and a liquid contained in the ink tank is ink. However, the contained substance not limited to ink. For example, a liquid like a processed liquid that is discharged to a printing medium to increase the fixing property or water repellency of a printed image or its image quality may be contained in the ink tank.

The above-described embodiment especially employs, of inkjet printing methods, a method of causing a change in ink state by thermal energy generated by using a means (e.g., an electrothermal transducer or laser beam) for generating thermal energy as energy to be used for ink discharge, thereby increasing the printing density and resolution.

In addition, the present invention is effective in both a serial scan printing apparatus as in the above-described embodiment and an apparatus using a printhead fixed to the apparatus main body or an interchangeable cartridge-type printhead that is attached to the apparatus main body to be electrically connected to it and supply ink from it.

The inkjet printing apparatus of the present invention can take not only a form of an image output apparatus of an information processing device such as a computer but also a form of a copying machine combined with a reader or a facsimile apparatus having transmission and reception functions.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-161421, filed on Jun. 1, 2005 which is hereby incorporated by reference herein in its entirety.

What is claimed is:

1. A printing system including a host apparatus which generates and transfers image data and a printing apparatus which executes multi-pass printing on a printing medium by receiving the transferred image data and scanning a printhead on the basis of the image data,
   wherein the host apparatus comprises:
   compression pattern generation means for generating a compression pattern which compresses the image data, wherein the compression pattern corresponds to a predetermined amount of image data and contains information designating whether or not each bit of the image data is thinned;
   compression means for compressing the image data corresponding to one print scan of the printhead by comparing each bit of the image data with a corresponding bit of the compression pattern generated by said compression pattern generation means; and
   transfer means for transferring, to the printing apparatus, the compression pattern generated by said compression pattern generation means and the compressed image data, compressed by said compression means, corresponding to one print scan of the printhead, and
   wherein the printing apparatus comprises:
   reception means for receiving the transferred compression pattern and the compressed image data;
   storage means for storing the compression pattern received by said reception means as a decompression pattern;
   decompression means for decompressing, by using the decompression pattern stored in said storage means, the compressed image data received by said reception means;
   a print buffer which stores the image data decompressed by said decompression means; and
   printing means for executing multi-pass printing by scanning the printhead by using the image data stored in said print buffer.

2. The system according to claim 1, wherein said compression means comprises:
   first compression means for executing compression using the compression pattern; and
   second compression means for packbits-compressing the image data compressed by said first compression means, and
   wherein said decompression means comprises:
   first decompression means for packbits-decompressing the received compressed image data; and
   second decompression means for decompressing, by using the decompression pattern, the image data packbits-decompressed by said first decompression means.

3. The system according to claim 1, wherein the compression pattern is changed for each image data to be used for one print scan of the printhead.

4. A printing method in a printing system including a host apparatus which generates and transfers image data and a printing apparatus which executes multi-pass printing on a printing medium by receiving the transferred image data and scanning a printhead on the basis of the image data, comprising the steps of:
   generating, at the host apparatus, a compression pattern which compresses the image data, wherein the compression pattern corresponds to a predetermined amount of image data and contains information designating whether or not each bit of the image data is thinned;
   compressing, at the host apparatus, the image data corresponding to one print scan of the printhead by comparing each bit of the image data with a corresponding bit of the generated compression pattern;
   transferring, from the host apparatus to the printing apparatus, the generated compression pattern and the compressed image data corresponding to one print scan of the printhead;
   receiving the transferred compression pattern and the compressed image data;
   storing, into a memory, the received compression pattern as a decompression pattern;
   decompressing, by using the decompression pattern stored in the memory, the received compressed image data, and storing the image data in a print buffer; and
   executing multi-pass printing by scanning the printhead by using the image data stored in the print buffer.

* * * * *